(12) United States Patent
Pye

(10) Patent No.: US 9,376,160 B2
(45) Date of Patent: Jun. 28, 2016

(54) AXLE ASSEMBLY

(71) Applicant: Hayes Bicycle Group, Inc., Mequon, WI (US)

(72) Inventor: Nicholas William Pye, Carrboro, NC (US)

(73) Assignee: HAYES BICYCLE GROUP, INC., Mequon, WI (US)

( * ) Notice: Subject to any disclaimer, the term of this patent is extended or adjusted under 35 U.S.C. 154(b) by 0 days.

(21) Appl. No.: 14/521,208

(22) Filed: Oct. 22, 2014

(65) Prior Publication Data

US 2015/0246706 A1    Sep. 3, 2015

Related U.S. Application Data

(60) Provisional application No. 61/899,142, filed on Nov. 1, 2013.

(51) Int. Cl.
*B60B 35/12* (2006.01)
*B62K 25/02* (2006.01)

(52) U.S. Cl.
CPC ............. *B62K 25/02* (2013.01); *B62K 2206/00* (2013.01)

(58) Field of Classification Search
CPC ....................................................... B62K 25/02
USPC ....................................................... 301/124.2
See application file for complete search history.

(56) References Cited

U.S. PATENT DOCUMENTS

| | | | | |
|---|---|---|---|---|
| 6,089,675 A * | 7/2000 | Schlanger | ............. | B60B 27/023 280/279 |
| 6,241,322 B1 * | 6/2001 | Phillips | ............... | B60B 27/0078 301/110.5 |
| 6,412,803 B1 * | 7/2002 | Lalikyan | ................ | B62K 25/02 280/276 |
| 6,435,622 B1 * | 8/2002 | Kanehisa | ............ | B60B 27/0005 301/110.5 |
| 7,530,645 B2 * | 5/2009 | Takachi | ................ | B62K 25/02 301/110.5 |
| 7,537,291 B2 * | 5/2009 | Hara | ..................... | B60B 27/026 301/110.5 |
| 7,556,321 B2 * | 7/2009 | Hara | ..................... | B60B 27/026 301/110.5 |
| 7,628,416 B2 * | 12/2009 | Hara | ..................... | B62K 25/02 280/260 |
| 7,648,211 B2 * | 1/2010 | Watarai | ............... | B60B 27/0052 301/110.5 |
| 7,654,546 B2 * | 2/2010 | Watarai | .................. | B62K 25/02 280/260 |
| 7,654,548 B2 * | 2/2010 | Kanehisa | ............... | B62K 21/02 280/260 |

(Continued)

*Primary Examiner* — Jeffrey J Restifo
(74) *Attorney, Agent, or Firm* — Zimmerman Intellectual Property Services LLC

(57) ABSTRACT

An axle assembly for a bicycle is disclosed. The axle assembly is configured to be installed at a mounting structure on the bicycle to mount a rotating hub of a wheel on the bicycle. The axle is secured to the mounting structure by a bolt; the bolt is nested in a retainer secured to the mounting structure. The axle has at least one non-circular section engaging a corresponding non-circular section of the mounting structure. The retainer is installed in a threaded section of the mounting structure. At initial installation of the axle assembly the retainer and the bolt of the axle assembly are installed on the mounting structure; subsequent installation and removal of the wheel/hub is accomplished by installation and removal of the axle performed by rotation of the bolt (using a tool or a tool-free feature) nested in the retainer. The axle assembly can be installed in the front fork (such as a front suspension fork) or the rear frame of the bicycle or other wheeled vehicle. The axle assembly comprises one or more of the inventive concepts and features shown and described in the specification and FIGURES.

22 Claims, 6 Drawing Sheets

(56) References Cited

U.S. PATENT DOCUMENTS

| | | | | |
|---|---|---|---|---|
| 8,042,881 B2* | 10/2011 | Inoue | B62K 23/06 | 280/279 |
| 8,075,010 B2* | 12/2011 | Talavasek | B62K 3/02 | 280/276 |
| 8,113,594 B2* | 2/2012 | Jones | B60B 27/026 | 280/279 |
| 8,573,879 B2* | 11/2013 | Chang | B62K 25/02 | 301/124.2 |
| 8,991,847 B2* | 3/2015 | Liu | B62K 21/24 | 280/263 |
| 2008/0197600 A1* | 8/2008 | Watarai | B62K 25/02 | 280/279 |
| 2008/0197604 A1* | 8/2008 | Hara | B62K 25/02 | 280/288.4 |
| 2008/0284127 A1* | 11/2008 | Watarai | B62K 25/02 | 280/279 |
| 2009/0115241 A1* | 5/2009 | Kanehisa | B62K 25/02 | 301/124.2 |
| 2009/0140571 A1* | 6/2009 | Chonan | B62K 25/02 | 301/124.2 |
| 2012/0261979 A1* | 10/2012 | Ashman | B60B 27/026 | 301/124.2 |
| 2013/0140876 A1* | 6/2013 | Lim | B62K 25/02 | 301/124.2 |
| 2013/0241271 A1* | 9/2013 | Lim | B62K 25/02 | 301/124.2 |
| 2014/0091614 A1* | 4/2014 | Fujita | B60B 27/0078 | 301/124.2 |
| 2014/0178147 A1* | 6/2014 | Lin | B62K 25/02 | 411/197 |
| 2014/0306512 A1* | 10/2014 | Nakajima | B62K 25/04 | 301/132 |
| 2015/0069827 A1* | 3/2015 | Nakajima | B62K 25/02 | 301/124.2 |
| 2015/0246706 A1* | 9/2015 | Pye | B62K 25/02 | 301/124.2 |
| 2016/0031521 A1* | 2/2016 | Voss | B62K 25/02 | 301/124.2 |

* cited by examiner

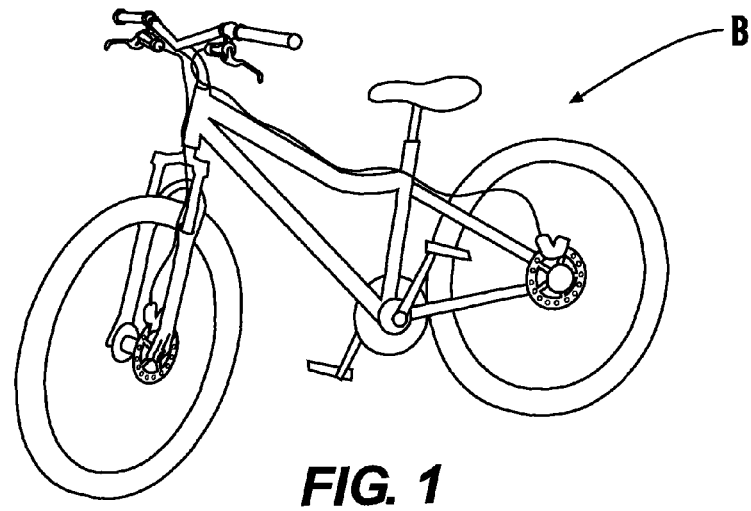
FIG. 1
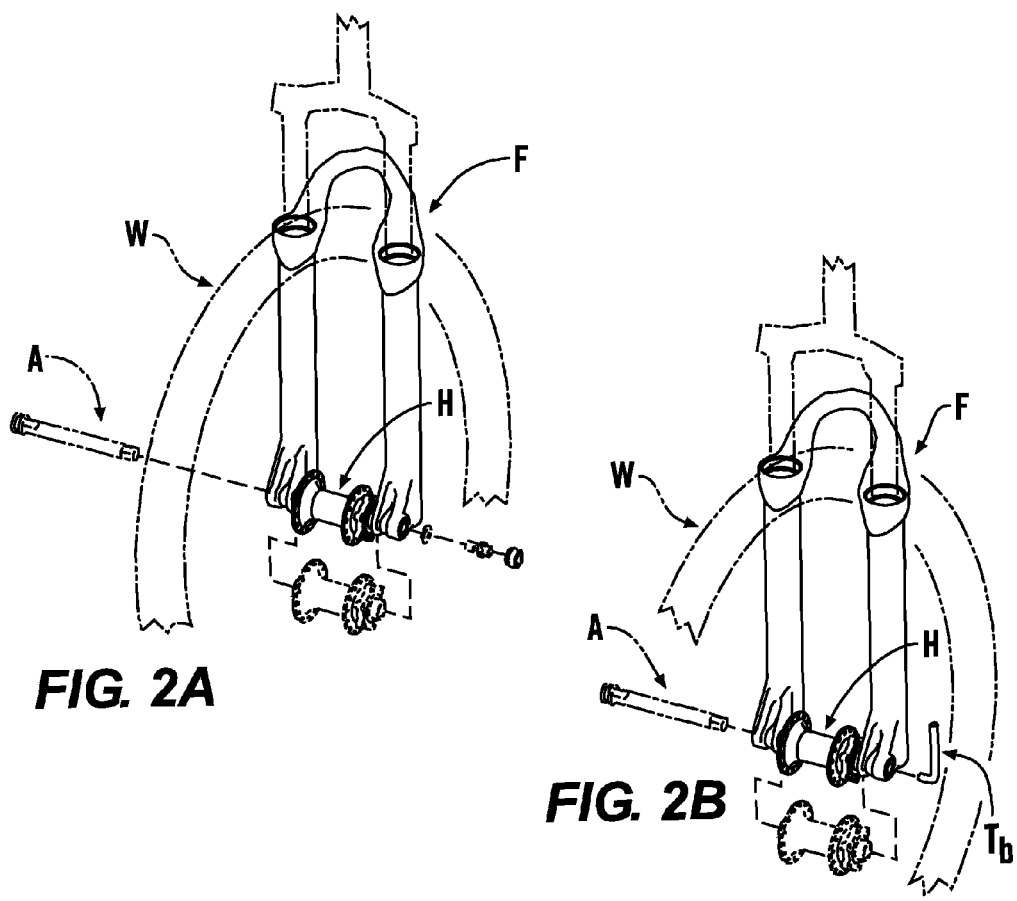
FIG. 2A   FIG. 2B

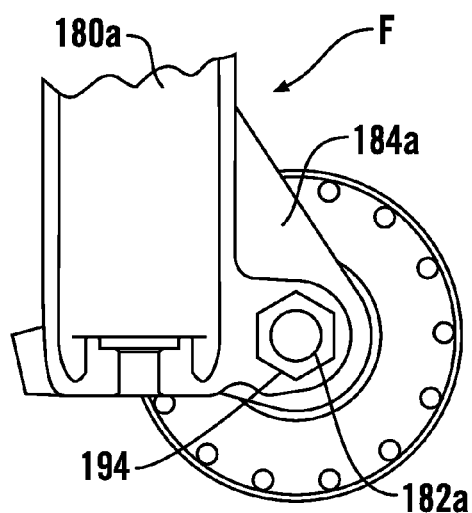 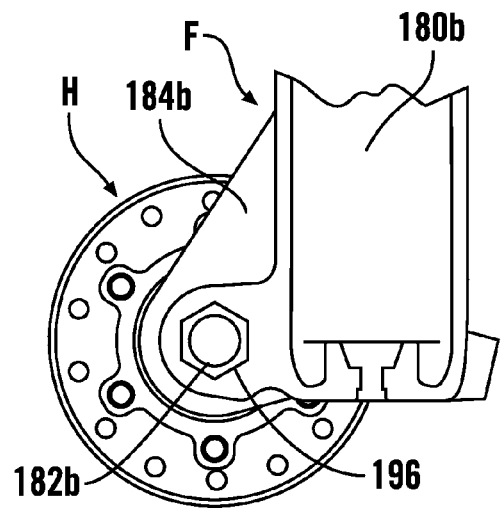
FIG. 5A   FIG. 5B
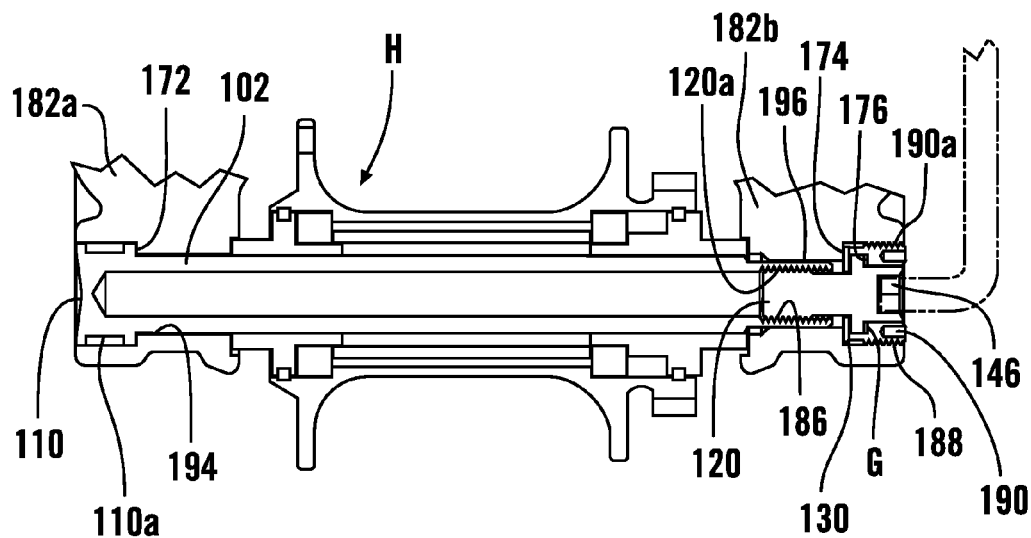
FIG. 6

AXLE ASSEMBLY

CROSS-REFERENCE TO RELATED APPLICATION

The present application claims the benefit of priority of U.S. Provisional Application No. 61/889,142 titled "Axle Assembly" filed on Nov. 1, 2013, which application is incorporated by reference.

FIELD

The present invention relates to an axle assembly. The present invention also relates to an axle assembly for a bicycle such as a mountain bike.

BACKGROUND

It is well-known to provide an axle assembly for a bicycle such as a mountain bike. In a typical arrangement an axle assembly is provided for the front wheel and back wheel of the bicycle; each wheel provides a hub installed on the axle assembly and the wheel/hub rotates upon the axle. The axle assembly in use will support (as distributed) the weight of the bicycle and the rider and is expected to provide for reliable operation in the expected operating conditions and under the forces and loads anticipated in use (e.g. withstanding stresses without mechanical failure, without developing undue resistance for the rotating wheel/hub, etc.).

It is also known to provide an axle assembly configured to allow for convenience in the installation and removal of the wheel/hub. For example, it is known to provide an axle assembly with a so-called "quick-release" mechanism as the front wheel of the bicycle by which a wheel/hub can be installed and removed in a generally convenient manner (e.g. relatively quickly and easily). Such an axle assembly is intended to provide enhanced convenience for storage/transport and repair/maintenance of the bicycle, for example removal of a wheel to fit the bicycle into a smaller space for transport or when fixing or changing a tire/tube on the wheel.

The design of such an axle assembly for a bicycle involves to some extent a balancing of considerations such as weight and strength and simplicity as well as features that affect use/reliability and convenience of assembly/installation and total cost.

SUMMARY

Accordingly, it would be advantageous to provide an axle assembly for a wheeled vehicle such as a bicycle that has an improved configuration providing (among other advantageous features) suitable performance and a relatively compact form that is relatively efficient to produce/assemble and relatively convenient to install/remove. In certain applications where the weight of the components of the bicycle is a concern it may be advantageous to provide components of an axle assembly that are relatively lightweight but provide suitable mechanical and structural strength for intended use (e.g. under expected loads, torsion and stresses, etc.). It would also be advantageous to provide an improved axle assembly that is configured to facilitate a balance of design considerations that is able to be optimized for a specific application/use or set of applications/uses.

The present invention relates to an axle assembly for a hub of a wheel for installation on a mounting structure providing a first end with an opening having a non-circular section and a second end with an opening having a non-circular section. The axle assembly comprises an axle member with a cylindrical section for the hub, a first end with an adjacent non-circular section configured to engage the non-circular section of the opening in the first end of the mounting structure, a second end with an adjacent non-circular section configured to engage the non-circular section of the opening in the second end of the mounting structure, an opening at the first end, and a feature adjacent the second end. The axle member provides structural rigidity when installed in the mounting structure. The axle assembly also comprises a bolt with a first end configured to be installed into the opening of the axle member and a second end with a feature configured to be engaged to install the bolt onto the axle member. The axle assembly further comprises a retainer configured to be installed within the opening of the first end of the mounting structure to retain the bolt within the first end of the mounting structure.

The present invention also relates to an axle assembly for a hub of a wheel for installation on a mounting structure providing a first end with an opening having a non-circular section and a second end with an opening having a non-circular section. The axle assembly comprises an axle member with a cylindrical section for the hub, a first end with an adjacent non-circular section configured to engage the non-circular section of the opening in the first end of the mounting structure, a second end with an adjacent non-circular section configured to engage the non-circular section of the opening in the second end of the mounting structure, a threaded opening at the first end, and a feature adjacent the second end. The axle assembly also comprises a bolt with a first end configured to be threaded into the threaded opening of the axle member and a second end with a feature configured to be engaged by a tool to install the bolt onto the axle member. The axle assembly further comprises a retainer configured to be installed within the opening of the first end of the mounting structure to retain the bolt within the first end of the mounting structure.

The present invention further relates to an axle assembly for a hub of a wheel for installation on a mounting structure providing a first end with an opening having a non-circular section and a second end with an opening having a non-circular section. The axle assembly comprises an axle member with a cylindrical section for the hub, a first end with an adjacent non-circular section configured to engage the non-circular section of the opening in the first end of the mounting structure, a second end with an adjacent non-circular section configured to engage the non-circular section of the opening in the second end of the mounting structure, a threaded opening at the first end, and a grip feature adjacent the second end. The axle assembly also comprises a bolt with a first end configured to be threaded into the threaded opening of the axle member, a shoulder, and a second end with a feature configured to be engaged to install the bolt onto the axle member. The axle assembly further comprises a retainer configured to be installed within the opening of the first end of the mounting structure at initial assembly to retain the bolt within the first end of the mounting structure.

FIGURES

FIG. 1 is a schematic perspective view of a mountain bicycle with an axle assembly according to an exemplary embodiment.

FIG. 2A is an exploded perspective view of the wheel/hub of a bicycle with the axle assembly as initially installed on a mounting structure shown as legs of a fork according to an exemplary embodiment.

FIG. 2B is an exploded perspective view of the wheel/hub of a bicycle with the axle assembly as installed/removed on a mounting structure shown as legs of a fork according to an exemplary embodiment.

FIGS. 5A and 5B are schematic cut-away side views of the axle assembly with hub as installed on a mounting structure shown as legs of a fork or frame according to an exemplary embodiment.

FIG. 6 is a schematic cross-section view of the axle assembly according to an exemplary embodiment.

DESCRIPTION

Referring to FIGS. 1 and 2A/B, a bicycle B with an axle assembly A is shown schematically according to an exemplary embodiment. The axle assembly is configured to be installed at a mounting structure on the bicycle (such as a bore/dropout on legs of a front fork casting or rear frame). The axle assembly is installed to mount a rotating hub of a wheel on the bicycle. The axle assembly provides the axle on which the hub of the wheel may be installed and mounted. The axle is secured to the mounting structure by a bolt; the bolt is nested in a retainer secured to the mounting structure. The axle has at least one non-circular section engaging a corresponding non-circular section of the mounting structure (shown as corresponding hex sections according to an exemplary embodiment). The retainer is installed in a threaded section of the mounting structure (such as within the bore or dropout in one leg of the fork casting). At initial installation of the axle assembly the retainer and the bolt of the axle assembly are installed on the mounting structure; subsequent installation and removal of the wheel/hub is accomplished by installation and removal of the axle. Installation and removal of the axle is performed by rotation of the bolt (using a tool or a tool-free feature) nested in the retainer. The axle assembly can be installed in the front fork (such as a front suspension fork) or the rear frame of the bicycle or other wheeled vehicle.

As indicated in FIG. 1 according to an exemplary embodiment, an axle assembly is installed at each (rotating) wheel of the bicycle. The axle assembly can be installed in the front fork or the rear frame of the bicycle. According to an exemplary embodiment shown schematically in FIG. 2A/B, the axle assembly A is configured to mount a wheel W with a hub H on a mounting structure (e.g. provided on as a fork F shown in the form of a front suspension fork). According to any exemplary embodiment, the axle assembly can be configured for use to mount a rotating wheel/hub on any of a wide variety of wheeled vehicles (e.g. other types of bicycles, motorized bicycles or other cycles, scooters, etc.); the axle assembly can be configured to mount the wheel/hub to any of a variety of mounting structures as provided on wheeled vehicles such as bicycles (e.g. in a circular bore or U-shaped dropout or slot on frames, fork structures, suspension forks, etc.).

Figure 3:
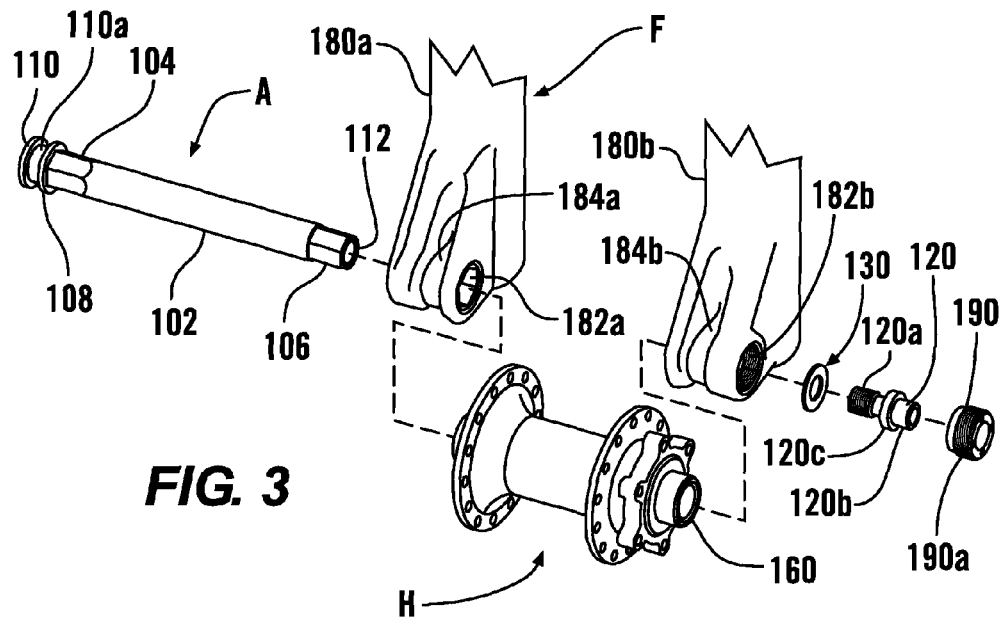
FIG. 3 is an exploded perspective view of the axle assembly with hub as installed on mounting structure shown as legs of a fork or frame according to an exemplary embodiment.
Figure 4:
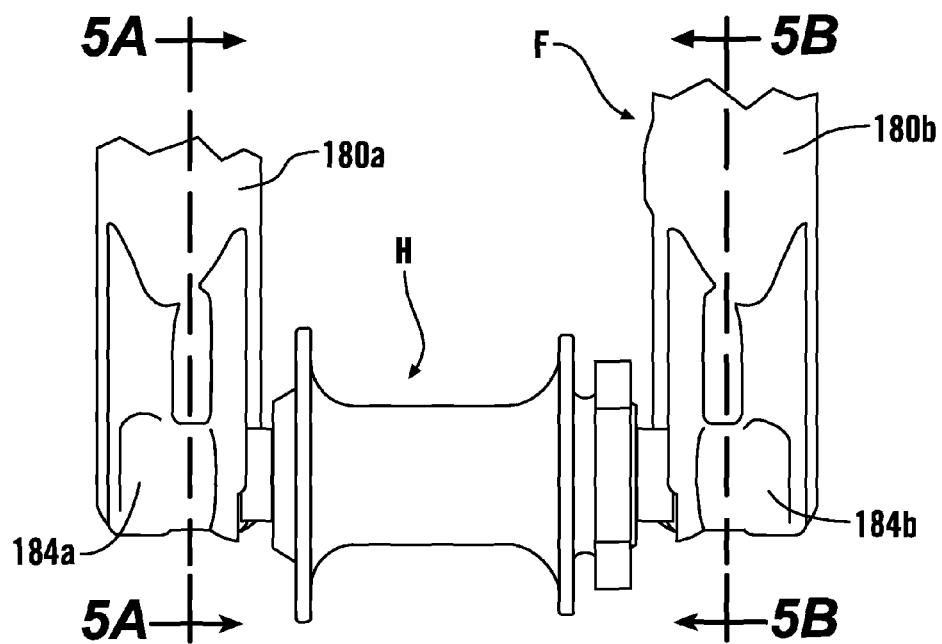
FIG. 4 is a schematic front plan view of the axle assembly with hub as installed on a mounting structure shown as legs of a fork or frame according to an exemplary embodiment.

Parts and components of the axle assembly according to an exemplary embodiment are identified in FIGS. 3 and 6.

According to an exemplary embodiment, the axle assembly comprises an axle 102 for supporting a rotating hub H (of a wheel) (through bore 160) and a bolt 120 with washer 130 coupled to a retainer 190. See FIGS. 2A/B, 3 and 6-8. Axle A extends through bore 182a in casting leg 180a at one end and into bore 182b in casting leg 180b at the other end. See FIGS. 2A/B and 3.

As shown, the axle 102 has a generally cylindrical form with at least one non-circular section according to an exemplary embodiment shown as a hex section (large) 104 and a hex section (small) 106 (see FIG. 3). Each non-circular section of the axle (e.g. each hex section) engages the a corresponding non-circular structure shown as seat 194 and seat 196 in a bore 182a/182b in mounting structure 184a/184b (e.g. each with a hex structure) to hold the axle in position in casting leg 180a/b (see FIGS. 3, 6-8 and 10A-10D). The retainer 190 has circumferential threads 190a; retainer 190 is secured by threads 190a within threads 188 in a bore of mounting structure 184b (see FIGS. 3, 6-8). The axle 102 is provided with an opening shown as bore with threads 112 that are engaged by threads 120a on the bolt 120 (see FIGS. 3, 8). The bolt 120 provides a shoulder 120c providing a flange to facilitate secure installation and nesting with retainer 190 in bore 182b of the mounting structure 184b in leg 180b. The retainer 190 allows for installation and removal of the axle 102 by rotation of the bolt 120 nested within the retainer 190; access to head 120b of bolt 120 is provided through an opening in retainer 190. According to an exemplary embodiment, head 120b of bolt 120 has a feature shown as a hex key socket 146 for tool $T_b$. See FIGS. 2B and 9B/C (see FIGS. 7-8). The bolt 120 can be configured for installation using a tool or without a tool (see FIG. 6).

Figure 7:
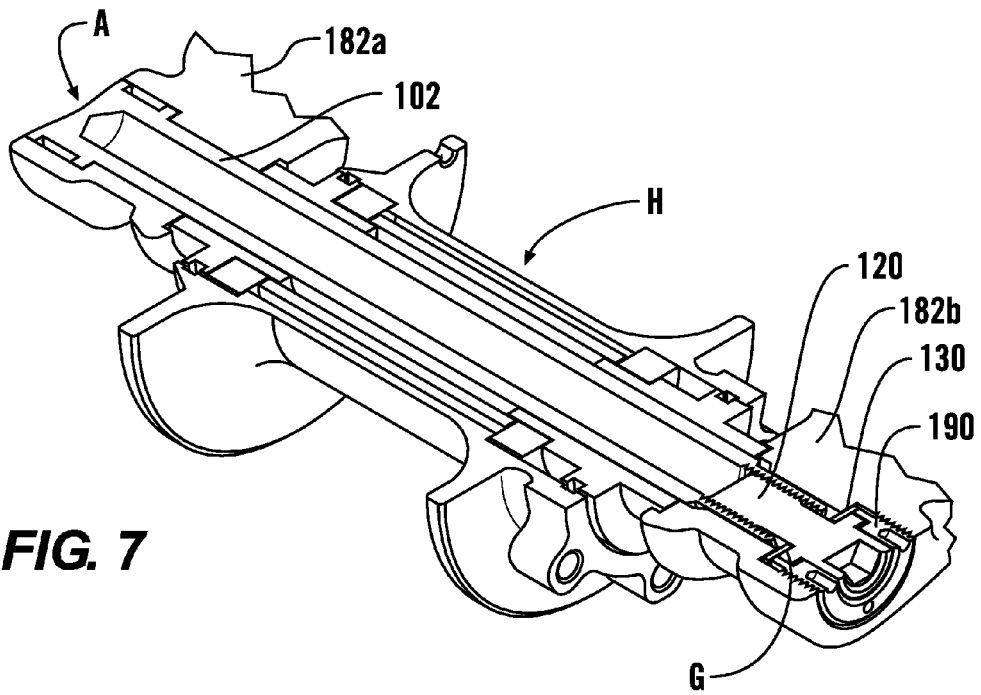
FIG. 7 is a schematic cut-away perspective view of the axle assembly according to an exemplary embodiment.
Figure 8:
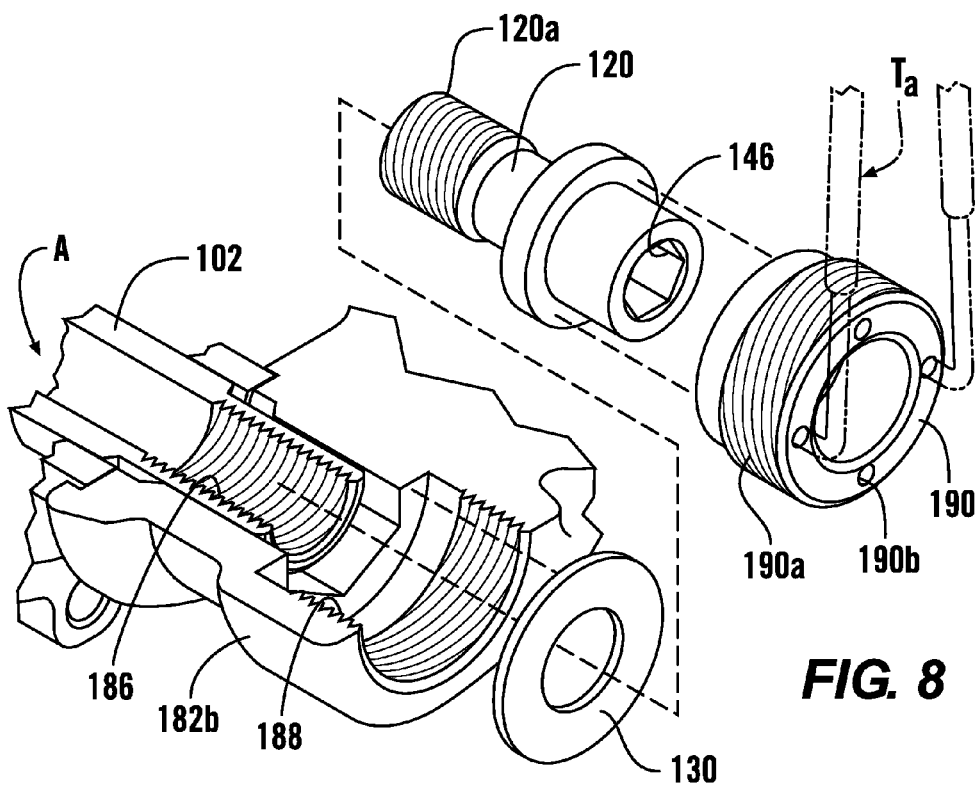
FIG. 8 is a schematic fragmentary detail cut-away perspective view of the axle assembly according to an exemplary embodiment.

According to an exemplary embodiment, as shown schematically in FIGS. 6-8, in the initial installation of the axle assembly the retainer 190 with nested bolt 120 and washer 130 is threaded into bore 182 of one leg 180a of the mounting structure 184b (e.g. threads of the retainer engage threads in the bore). See also FIG. 3. Initial installation of the retainer of the axle assembly may occur when the bicycle with the axle assembly is initially assembled. See FIG. 2A. (A pin spanner tool $T_a$ is used for the installation of the retainer 190 according to an exemplary embodiment is shown in FIG. 8.)

According to an exemplary embodiment, the retainer with bolt and washer will remain installed after initial installation (in ordinary operation) (see FIGS. 2A and 10A-10D); subsequent future installation and removal of the hub/wheel mounted by the axle assembly is accomplished by removal of only the axle of the axle assembly (see FIGS. 2B and 10A-10D). See also FIGS. 3 and 9A-9D. Subsequent installation and removal of the axle may be repeated over time without requiring removal (or re-installation) of the retainer or nested bolt/washer of the axle assembly as indicated in FIGS. 2B, 9A-9D and 10A-10D.

Figure 9A:
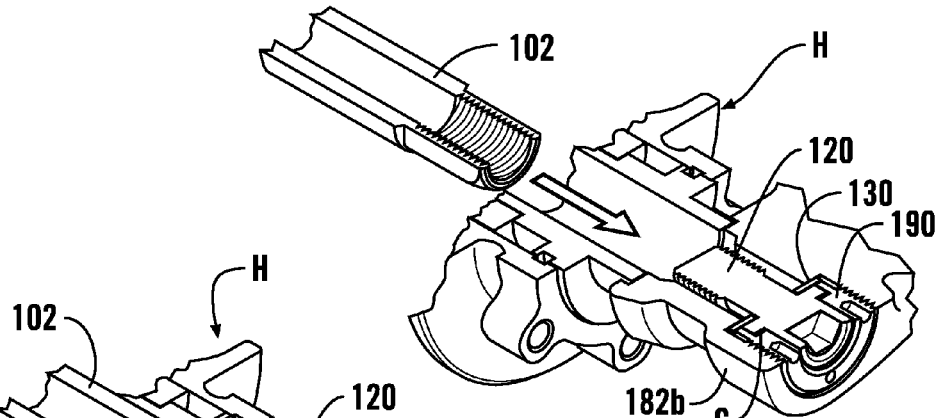
FIGS. 9A to 9D are schematic fragmentary detail cut-away perspective views of the installation of the axle assembly according to an exemplary embodiment.
Figure 9B:
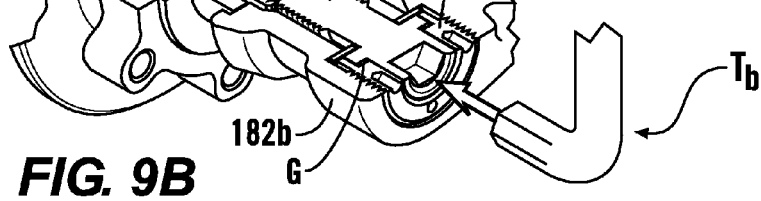
Figure 9C:
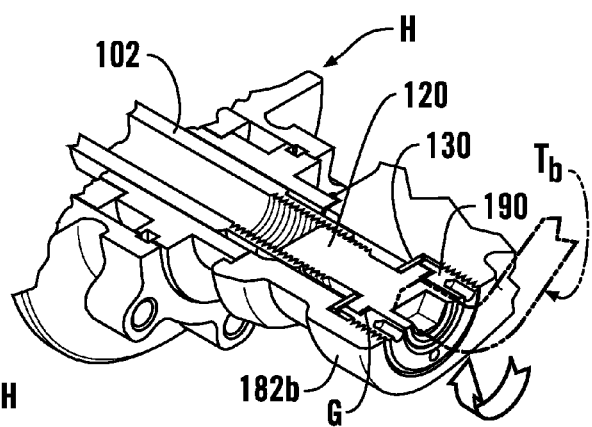
Figure 9D:
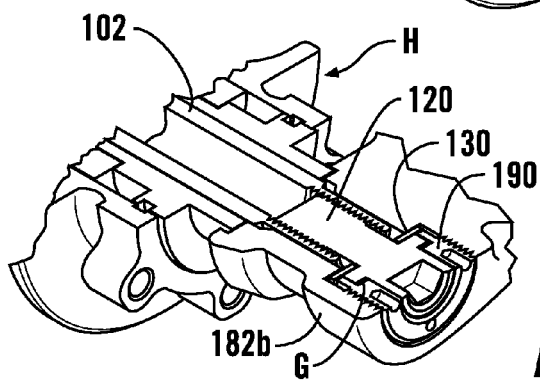
Figure 10A:
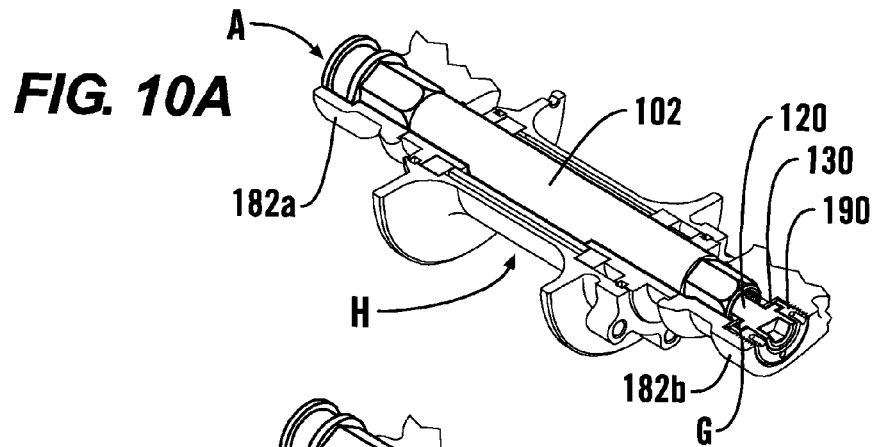
FIGS. 10A to 10D are schematic detail cut-away perspective views of the removal of the axle assembly according to an exemplary embodiment.
Figure 10B:
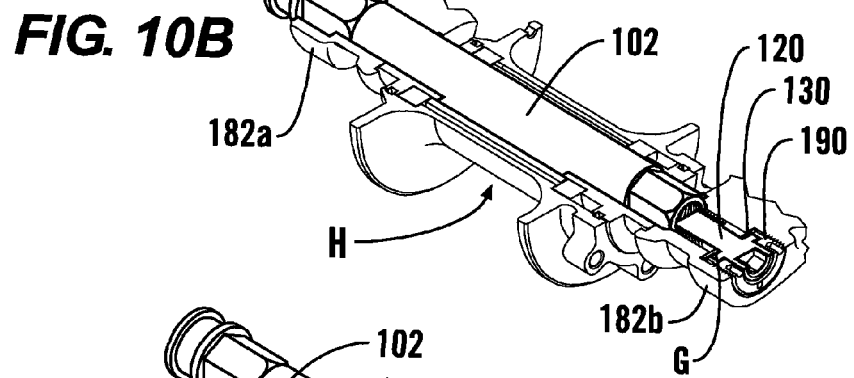
Figure 10C:
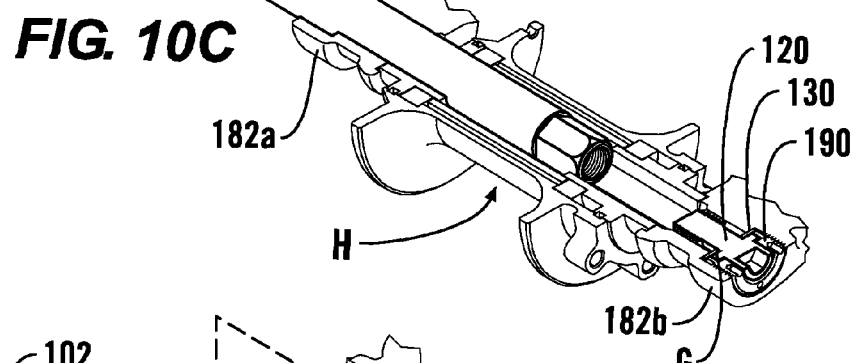
Figure 10D:
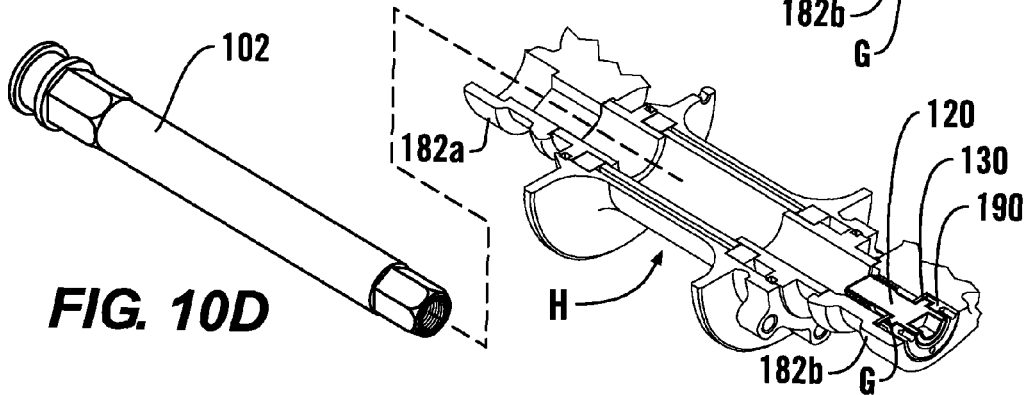

According to an exemplary embodiment, when the axle assembly is installed on the mounting structure (e.g. casting leg of a front fork or rear frame) the axle 102 is secured by the bolt 120 (e.g. threads 186 of the axle engage threads 120a on the bolt); each non-circular (e.g. hex) section 104 and 106 of the axle 102 is retained in a corresponding non-circular (e.g. hex) seat 194 and 196 in a bore of the mounting structure (e.g. hex section seats in bore 182a/182b of structure 184a/184b). See FIGS. 6, 8 and 10D. (An allen wrench tool $T_b$ is used for engaging the hex key socket 146 in bolt 120 during installation and removal of the axle 102 according to an exemplary embodiment is shown in FIGS. 6 and 9B-9C.)

Installation and removal of the axle (e.g. to install/mount a wheel/hub) is shown schematically according to the exemplary embodiment in FIGS. 2A/B, 3, 8, 9A-9D and 10A-10D.

Installation:

In initial installation of the axle assembly, the washer and bolt with retainer are inserted and secured in a bore in one leg of the mounting structure to remain (unless and until the time when the entire axle assembly is removed). See FIGS. 7 and 8. The axle of the axle assembly is used to install the hub/wheel initially or to re-install the hub/wheel after it has been removed. See FIGS. 2A/B. To install the wheel, the hub is placed between the first leg and second leg of the mounting structure. See FIGS. 2A/B, 3 and 6. The axle is inserted through the bore in the first leg then through the hub and then into the bore or dropout in the second leg. See FIGS. 2A/B, 3, 9A and 9B. The bolt is threaded to the axle and is tightened to bring the shoulder 172 of the axle toward contact with a mating shoulder in the bore or dropout of the second leg. See FIGS. 6, 9B and 9C. The bolt is further tightened to retain the axle and to close any gap between the hub and each leg of the mounting structure. See FIGS. 2-3 and 9D. In the fully-tightened condition (e.g. fully installed), the bolt flange is brought into contact against the washer and has clearance to the retainer; a gap G is created at the other side of the bolt flange adjacent the retainer. See FIGS. 6, 7, 9D and 10A.

Removal:

To initiate removal, the bolt is rotated within the retainer to unthread from the axle and the flange structure of the bolt will lift off the nut structure and contact the retainer. See FIGS. 6, 10A and 10B. The bolt is loosened until a shoulder 174 on the bolt contacts a mating shoulder 176 on the retainer. See FIGS. 6, 10A and 10B. Continuing to unthread the bolt will drive the axle out of the bore or dropout on the mounting structure as the bolt remains against the retainer; each non-circular (e.g. hex) section of the axle is retained in a corresponding non-circular (e.g. hex) seat in the bore or dropout of a leg of the mounting structure (when seated the axle is unable to rotate within the bore or dropout). See FIG. 10B. Further loosening of the bolt drives the axle along an axial direction as the axle is completely unthreaded from the bolt; as the axle is unthreaded an end of the axle projects outside of the bore or dropout of the mounting structure. See FIGS. 10C and 10D. Once the axle has been completely unthreaded from the bolt the axle can be removed from the mounting structure. See FIGS. 2B and 3. The end of the axle comprises a feature at end 110 shown as providing a flange/projection set 108 and indentation (e.g. recess forming a grip area 110a) that facilitates removal of the axle; as the feature is extended from the mounting structure and the axle is unthreaded from the bolt and axle member can be grasped by hand and completely withdrawn from the hub and the bores or dropouts in the mounting structure. See FIGS. 3, 6 and 10D. The hub (and wheel) can then be removed. See FIGS. 2B and 3. According to an exemplary embodiment, the retainer with bolt/washer of the axle assembly will remain installed in the mounting structure during removal of the axle and hub/wheel (e.g. the retainer is not removed unless the entire axle assembly is to be removed); with the retainer remaining in place, the hub/wheel can be re-installed on the axle using the bolt nested in the retainer as shown in FIGS. 9A-9D.

According to an exemplary embodiment the components of the axle assembly will be formed from a suitable metal alloy material (such as 7075-T6 aluminum for the axle and retainer and stainless steel for the bolt and washer) or other suitable materials that may be selected for the application.

Axle assemblies/systems are provided in many different configurations, sizes, forms and designs. According to any preferred embodiment, the axle assembly is intended to achieve advantages over current axle systems; the axle assembly may be provided in a wide variety of configurations and sizes including over a size range typically provided (e.g. 9-20 mm or other) for the axle component. In comparison with current smaller (e.g. current 9 mm) quick-release axle systems, advantages can be achieved such as strength (able to withstand greater forces without component failure), enhanced structural/torsional rigidity (e.g. due to the non-circular section(s) at each bore/dropout) and fewer components. Advantages over other (e.g. current 15 mm) quick-release axle systems can be achieved such as fewer parts, reduced cost to manufacture and reduced weight. Advantages over current larger (e.g. current 20 mm) axle systems can be achieved such as reduced cost to manufacture, reduced weight, enhanced convenience to install and remove (e.g. with relatively improved speed and efficiency).

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the system and method of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. An axle assembly for a hub of a wheel for installation on a mounting structure providing a first end with an opening having a non-circular section and a second end with an opening having a non-circular section comprising:
   an axle member comprising:
   (a) a cylindrical section for the hub;
   (b) a first end with an adjacent non-circular section configured to engage the non-circular section of the opening in the first end of the mounting structure;
   (c) a second end with an adjacent non-circular section configured to engage the non-circular section of the opening in the second end of the mounting structure;
   (d) an opening at the first end; and
   (e) a feature adjacent the second end;
   so that the axle member provides structural rigidity when installed in the mounting structure;
   a bolt comprising:
   (a) a first end configured to be installed into the opening of the axle member,
   (b) a second end with a feature configured to be engaged to install the bolt onto the axle member;

a retainer configured to be installed within the opening of the first end of the mounting structure to retain the bolt within the first end of the mounting structure.

2. The assembly of claim 1 wherein the opening at the first end of the axle member is a threaded opening and the first end of the bolt is a threaded end so that the bolt can be threaded into and out of the threaded opening at the first end of the axle member.

3. The assembly of claim 2 wherein the bolt is nested by the retainer at the first end of the mounting structure.

4. The assembly of claim 3 wherein the bolt comprises a shoulder with a flange section that provides a first surface facing the first end and a second surface facing the second end; wherein the first surface of the flange section of the shoulder of the bolt is secured to a surface within the opening of the first end of the mounting structure; and wherein the shoulder of the bolt is retained by the retainer.

5. The assembly of claim 4 wherein the feature of the axle member comprises a projection; wherein the projection comprises a flange providing a surface that can be accessed to facilitate removal of the axle member from the second end of the mounting structure.

6. The assembly of claim 5 wherein the retainer retains the bolt in the opening of the first end of the mounting structure so that as the threaded end of the bolt is unthreaded from the threaded opening of the axle member the second end of the axle member begins to extend from the opening of the second end of the mounting structure.

7. The assembly of claim 6 wherein the *grip* feature at the second end of the axle member becomes accessible at the opening of the second end of the mounting structure.

8. The assembly of claim 7 wherein the feature at the second end of the bolt is engaged by a tool to thread the bolt into and out of the axle member.

9. The assembly of claim 8 wherein the mounting structure comprises a fork for a suspension system.

10. The assembly of claim 1 wherein the second end of the bolt is a circular end.

11. An axle assembly for a hub of a wheel for installation on a mounting structure providing a first end with an opening having a non-circular section and a second end with an opening having a non-circular section comprising:
an axle member comprising:
(a) a cylindrical section for the hub;
(b) a first end with an adjacent non-circular section configured to engage the non-circular section of the opening in the first end of the mounting structure;
(c) a second end with an adjacent non-circular section configured to engage the non-circular section of the opening in the second end of the mounting structure;
(d) a threaded opening at the first end; and
(e) a feature adjacent the second end;
a bolt comprising:
(a) a first end configured to be threaded into the threaded opening of the axle member;
(b) a second end with a feature configured to be engaged by a tool to install the bolt onto the axle member;
a retainer configured to be installed within the opening of the first end of the mounting structure to retain the bolt within the first end of the mounting structure.

12. The assembly of claim 11 wherein the first end of the bolt is a threaded end and wherein the retainer retains the bolt in the opening of the first end of the mounting structure so that as the threaded end of the bolt is unthreaded from the threaded opening of the axle member the second end of the axle member begins to extend from the opening of the second end of the mounting structure.

13. The assembly of claim 12 wherein the bolt comprises a shoulder; wherein the shoulder of the bolt comprises a flange section that provides a first surface facing the threaded end and a second surface facing the second end; wherein the first surface of the flange section of the shoulder of the bolt is secured to a surface within the opening of the first end of the mounting structure.

14. The assembly of claim 13 further comprising a washer between the first surface of the flange section of the shoulder of the bolt and the surface within the opening of the first end of the mounting structure.

15. The assembly of claim 11 wherein the bolt comprises a shoulder retained in a recess in the opening of the first end of the mounting structure by the retainer; wherein when the retainer is installed a gap is provided between the retainer and the shoulder of the bolt.

16. The assembly of claim 11 wherein the retainer is configured to be installed by threaded connection within the opening of the first end of the mounting structure.

17. An axle assembly for a hub of a wheel for installation on a mounting structure providing a first end with an opening having a non-circular section and a second end with an opening having a non-circular section comprising:
an axle member comprising:
(a) a cylindrical section for the hub;
(b) a first end with an adjacent non-circular section configured to engage the non-circular section of the opening in the first end of the mounting structure;
(c) a second end with an adjacent non-circular section configured to engage the non-circular section of the opening in the second end of the mounting structure;
(d) a threaded opening at the first end; and
(e) a grip feature adjacent the second end;
a bolt comprising:
(a) a first end configured to be threaded into the threaded opening of the axle member;
(b) a shoulder; and
(c) a second end with a feature configured to be engaged to install the bolt onto the axle member;
a retainer configured to be installed within the opening of the first end of the mounting structure at initial assembly to retain the bolt within the first end of the mounting structure.

18. The assembly of claim 17 wherein the shoulder of the bolt is retained in a recess in the opening of the first end of the mounting structure by the retainer, wherein when the retainer is installed a gap is provided between the retainer and the second surface of the flange section of the shoulder of the bolt; wherein the retainer provides an opening through which the feature of the bolt can be accessed.

19. The assembly of claim 17 wherein the first end of the bolt is a threaded end and wherein the retainer provides an opening through which the feature of the bolt can be accessed by a tool so that the threaded end of the bolt can be threaded into the threaded opening at the second end of the axle member.

20. The assembly of claim 18 wherein the retainer retains the bolt in the opening of the first end of the mounting structure so that as the threaded end of the bolt is unthreaded from the threaded opening of the axle member at least a portion of the second end of the axle member begins to extend from the opening of the second end of the mounting structure.

21. The assembly of claim 17 wherein the retainer is configured to be installed by threaded connection within the opening of the first end of the mounting structure at initial assembly to retain the bolt within the first end of the mounting structure.

22. The assembly of claim 17 wherein the non-circular section of the first end of the axle member comprises a hexagonal shape and the feature of the axle member comprises a grip feature providing a flange and a recessed section to facilitate access to facilitate removal of the axle member and hub from the mounting structure.

* * * * *